United States Patent Office 3,754,051
Patented Aug. 21, 1973

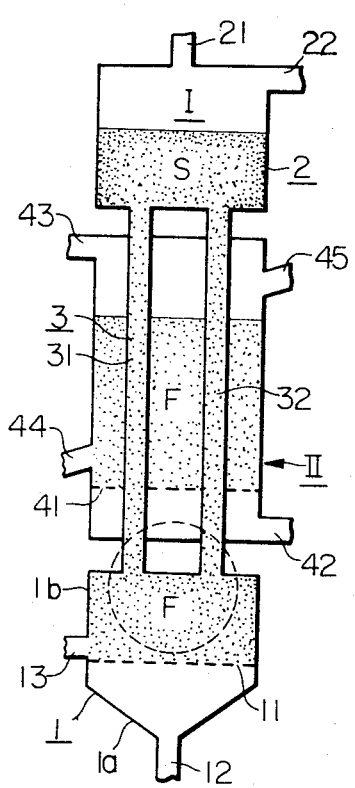
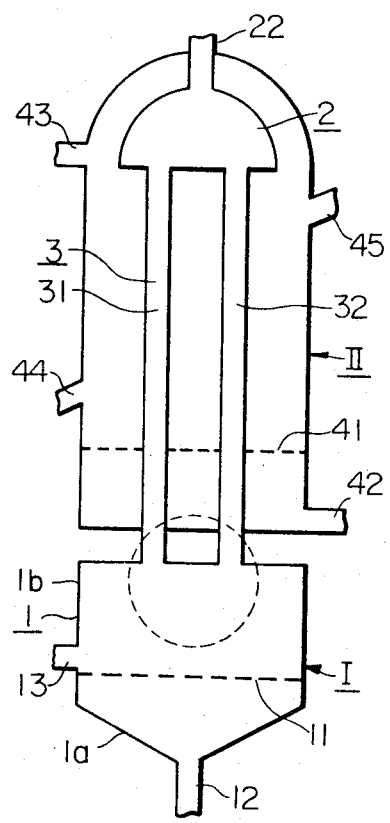
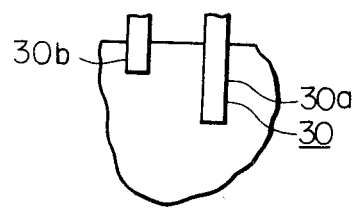

3,754,051
PRODUCTION OF OLEFIN FROM SATURATED HYDROCARBON
Yuichi Suzukawa, Hisashi Kono, Shigeyuki Nakai, Kohei Ninomiya, Atsushi Kuribayashi, and Masahiko Kitajima, Ube, Japan, assignors to Ube Industries, Ltd., Yamaguchi-ken, Japan
Filed July 27, 1971, Ser. No. 166,538
Claims priority, application Japan, Aug. 11, 1970, 45/69,741
Int. Cl. C07c 5/18; B01j 9/20
U.S. Cl. 260—683.3                12 Claims

ABSTRACT OF THE DISCLOSURE

This invention relates to an improved method for the continuous production of olefin from saturated hydrocarbon in a fluidized bed reactor comprising a reacting vessel and a heating vessel having a lower chamber provided with a perforated plate therein, an upper chamber and an intermediate portion consisting of a plurality of conduits fluidly connected to both chambers in such an arrangement that the reacting vessel encloses at least the conduits of the heating vessel. To effect dehydrogenation of the material gas in the reacting vessel, a circulating stream containing solid particles fluidized and heated by a heating gas feed is created in the heating vessel, between both chambers through the conduits, whereby sufficient heat for the dehydrogenation is continuously transferred from the circulating stream in the heating vessel to a fluidized catalyst bed in the reacting vessel through the conduits.

---

The present invention relates to an improvement in the production of olefin from saturated hydrocarbon, more particularly relates to dehydrogenating the hydrocarbon in a novel fluidized bed reactor for producing the olefin.

Hitherto, there have been several methods of producing olefins such as propylene and butene, by the dehydrogenation of saturated hydrocarbons having at most five carbon atoms, for example, propane, butane, etc.

In a typical method referred to as the "Houdry Process," the dehydrogenation of a material gas is carried out in a fixed bed reactor, filled with a catalyst. Thereafter, a steam purging process is carried out and then the carbonaceous substance deposited on the catalyst during dehydrogenation is burned with a suitable heating gas, thereby regenerating the catalyst as well as raising the temperature of the catalyst bed which has declined owing to the endothermic reaction. The above processes are repeated in sequence in the reactor. However, such a method requires sufficient heat accumulation in the catalyst fixed bed for carrying out the dehydrogenation which is an endothermic reaction involving the combustion of the carbonaceous substance and/or the fuel. In the aforesaid reaction, there are some objectionable features in that the reaction temperature in the reaction process declines considerably and further, a large amount of carbonaceous substance is deposited on the catalyst causing a decrease of the catalyst activity, thereby making it difficult to maintain the reaction rate and the selectivity of the catalyst at high levels. In addition, a purging process due to certain inert gases is required at each reaction and also a regeneration process for preventing explosion of the material gas and the reaction product gas, both being explosive, whereby the reaction operation becomes highly complicated and further, the amounts of the processed material gas per unit time and unit volume of the reactor become less because such a purging operation must be performed intermittently.

In another conventional technique, the reaction is carried out continuously in such a fluidized bed reactor as is, for example, described in U.S. Pat. 3,238,271. In this process, a material gas fed into the reactor is heated by the sensible heat of the catalyst particles and the dehydrogenation of the heated material gas is carried out in the presence of the catalyst. The deactivated catalyst particles owing to the deposition of carbonaceous substance are removed from the reactor and the carbonaceous substance on the catalyst is burnt with a proper fuel in a regenerator. The resultant heated particles are returned to the reactor. This method requires a cycling operation of a great amount of the catalyst particles between the reactor and the regenerator for the dehydrogenation instead of the repeated purging operation in the former method set forth. Accordingly, this method has defects such as a heat loss, and attrition and/or damage of the catalyst particles.

In addition to the above, heating of the catalyst particles to high temperature in the regenerator effects sintering of the catalyst particles resulting in the permanent deactivation thereof.

This invention has been completed based upon the following discovery. Through study with the purpose of obviating or avoiding such objectionable features in the methods mentioned above and having in mind the facts that a fluidized bed has a great heat transfer coefficient and fluidized solid particles flowing in the conduit have greater ability to transport their sensible heat calories per unit volume than the gas only has, it has been found that with a certain method of heat transmission to the fluidized catalyst bed for dehydrogenation, the objectionable features of the aforedescribed conventional methods can be avoided and thus, a continuous production of olefin, from saturated hydrocarbons such as ethane, propane, butane and pentane, particularly hydrocarbons having five carbon atoms or less, can be carried out effectively without any decrease of catalyst activity.

There is provided, according to the present invention, a method of producing olefin from the saturated hydrocarbon in a reacting vessel of a fluidized bed type, containing proper catalyst particles, which vessel is incorporated with a heating vessel, containing solid particles as a heat transfer medium, having (a) a lower chamber provided with a perforated plate for forming a fluidized bed of said solid particles, (b) an upper chamber and (c) an intermediate portion consisting of a plurality of conduits fluidly connected to both chambers, the reacting vessel enclosing at least the heating vessel conduits. In the above heating vessel, a heating gas at high temperature is fed to the lower chamber to pass upwardly through the perforated plate and the conduits and then is discharged out of the upper chamber, while a fluidized bed of the catalyst particles is maintained in the reacting vessel by a material gas feed; thereby a circulating stream of the fluidized and heated solid particles by the heating gas feed, is created in the heating vessel, between both chambers through the conduits, and sufficient reaction heat, to effect the dehydrogenation of the material gas, is transferred from the circulating stream to the fluidized catalyst bed in the reacting vessel through at least the conduits.

Due to the above method, particularly the method of transferring the reaction heat, a large heat transfer from the heating vessel to the reacting vessel is obtained because a large amount of the solid particles having a large heat capacity is forced to circulate through the conduits disposed within the reacting vessel. Under suitable conduit parameters, such as number, diameter and length, the heat transfer coefficient of the conduits may be between 100 and 500 kcal./m.$^2$·hr. Therefore, the invention has features wherein sufficient heat of the dehydrogenation can be transferred to the reacting system and a continuous process of dehydrogenation reaction can be carried out in the reacting system.

To clarify an additional feature of the present invention, consideration will now be given to a process for dehydrogenation in the reacting vessel which is incorporated with the heating vessel by applying the heat energy contained in the high temperature gas, wherein said high temperature gas is fed to the heating vessel under the condition that the fluidizing solid particles are removed therefrom.

In the above process, the assumption is made that the high temperature gas, at the same temperature 1300° C. and same volume rate of fluid 152 Nm.$^3$/. as for the Example 1 described later, is fed to the heating vessel so as to pass through the conduits therein so as to transfer its heat to the reacting vessel; thereby the dehydrogenation is carried out in the reacting vessel and the gas is thus removed from the heating vessel at the same temperature 650° C. as for Example 1.

In other words, the assumption is made that the thermal efficiency of the above process is the same as for that of the present invention, in spite of the absence of fluidizing solid particles in the heating vessel.

But in this case, the film coefficient of heat transfer at the conduit wall is so small that a larger area of the heating surface would be required to achieve the quantity of heat transfer of the present invention. Such larger area may be produced by mounting the conduits in the reacting vessel in a multi-pass configuration such as "a shell and tube." Further the conduits would be required to be made of a metallic material so as to resist high temperatures of the order of 1300° C., because the conduits are forced to make partial contact with gas of such high temperature.

According to the present invention, the high temperature gas at 1300° C. fed to the heating vessel through the perforated plate is effectively supplied to the fluidized solid particles in the form of sensible heat because of the high efficiency of heat transfer between the solid particles and the gas in the fluidized bed and thus the gas is cooled down quickly from 1300° C. to 800° C.

Thus, the invention has the additional feature that the material used for the conduit may have a relatively lower operating temperature.

The invention will now be described in detail by way of preferred embodiments with reference to the accompanying drawings in which;

FIG. 1 is a diagrammatic view of a sectional elevation depicting a fluidized bed reactor in accordance with the invention, FIG. 2 is a diagrammatic view of another embodiment of a fluidized bed reactor according to the invention, FIG. 3 is an enlarged diagrammatic view of a modification of the conduits in the heating vessel with respect to the part enclosed by the dotted circles in FIGS. 1 and 2.

With reference to FIG. 1, a fluidized bed reactor comprises a heating vessel I and a reacting vessel II incorporated therewith. The heating vessel I has a lower chamber 1, an upper chamber 2 and an intermediate portion consisting of a plurality of vertical conduits 3 which are connected fluidly to both chambers. The lower chamber is provided with a perforated plate 11 for forming a fluidized bed thereon in the usual arrangement for separating it into two sections 1a and 1b. The lower section 1a is a funnel-type for feeding a fluidizing gas used as a heating gas thereinto from underneath through a gas inlet 12. The upper section 1b is a cylindrical chamber for containing solid particles adapted as a heat transfer medium and for forming the fluidized bed therein. Numeral 13 denotes an outlet for the removal of the solid particles.

The upper chamber is of a cylindrical type and has an inlet 21 for feeding the solid particles therein at a top-center portion and an exhaust gas outlet 22 near the top.

The conduits are thin pipes of substantially the same dimensions, vertically disposed between the lower chamber 1 and the upper chamber 2.

The reacting vessel II has a perforated plate 41 therein and a gas inlet 42, a gas outlet 43, a particle inlet 45 for delivering the solid particles onto the perforated plate 41 and a particle outlet 44 on the wall thereof to serve as a vessel for fluidizing a bed of catalyst particles on the perforated plate 41 by a material gas feed. The reacting vessel II is incorporated with the heating vessel I in an arrangement enclosing the conduits 31 and 32 of the heating vessel I so as to extend through the bottom wall thereof, the perforated plate 41 therein and the top wall thereof.

In the heating vessel I, a heating gas, at high temperature, fed into the lower section 1a of the lower chamber 1 through the gas inlet 12, passes upwardly into the upper section 1b through the perforated plate 11 and flows upwardly from the upper section 1b to the upper chamber 2 through the pipes 31 and 32, and is finally discharged out of the upper chamber to the exterior through the exhaust gas outlet 22. In such a process, the gas effects a fluidization of a proper amount of the solid particles delivered into the vessel I and thus, a fluidized bed is formed in the upper section 1b of the lower chamber 1. The heating gas, at high temperature, fed into the upper section 1b of the lower chamber 1 supplies its enthalpy to the solid particles forming the fluidized bed in the lower chamber, thereby being cooled to the proper lower temperature. The heated particles in such a fluidized bed rise, in the fluidized state, from the upper section 1b to the upper chamber 2 through the vertical pipes 31 or 32. The elevated particles effect a fluidization of the particles within the upper chamber 2 to form a spouted bed S therein and then descend, in the fluidized state, from the upper chamber 2 to return to the lower chamber 1 through the pipe 32 or 31, that is, a different conduit from that of the elevating passage. As a result, a circulating stream containing a certain amount of particles is created between both chambers through the conduits.

The circulation developing process will now be described in detail.

In the initial process, the gas passing through the conduits 31 and 32 flows upwardly together with the solid particles in the fluidized bed F of the lower chamber 1. However, a difference between gas velocities in both conduits is produced owing to the difference between the fluid resistances to the gas in both conduits. Particularly, at the beginning, a difference (though slight) between the gas velocities is produced spontaneously in spite of the conduits having the same substantial dimensions.

Now, assuming that the gas flowing through the conduit 31 is slightly faster initially than the other, the solid particles flow through the conduit 31 at an increasing velocity, while the velocity of the partcle stream through the other conduit 32 flows at a decreasing velocity. In this connection, a so-called "transported phase of the solid particles" is created in the conduit 31 while the other conduit 32 tends to prevent such phenomenon. Consequently, the difference between the fluid resistances increases between both conduits accordingly, and finally, the conduit 31 creates a distinct upward transport of the particles in the fluidized bed of the lower chamber 1 to the upper chamber 2, while the other conduit 32 creates a state wherein the fluidized particles in the upper chamber 2 descend toward the lower chamber 1 through the conduit 32. Thus, the solid particles in both chambers are fluidized, respectively, and simultaneously are interchanged through both conduits to create the circulating stream of particles in a fluidized state.

A preferable circulation of the solid particles between both chambers may be accomplished by adjusting a feed of the heating gas so as to obtain sufficient average gas velocity in the conduits, of ten times or more, the minimum fluidizing velocity.

Referring to FIG. 1, the heating vessel involving only two conduits, that is, two pipes 31 and 32 has been described for convenience of explanation only. However, such heating vessels having five conduits or more is preferable in practice. In such cases, of course, at least one conduit serves as an elevating conduit, while the remaining conduits serve as descending conduits. The intermediate portion consisting of the plurality of conduits may be provided in such a preferable manner, that a ratio of a total of cross-sectional areas of the conduits to a horizontally-sectional area of the lower chamber is 1/25 or more, particularly 1/10 or more, even though such a preferable manner depends on the particle size, the gas velocity, etc. The above ratio results in the most preferable circulation of the solid particles between both chambers of the heating vessel. An improvement of such circulation may be attained by a modified arrangement regarding the part indicated by the dotted circle in FIG. 1. In such an arrangement, at least one of the conduits has a downward extension 30 from the upper wall of the lower chamber 1 or all of the conduits extend downwardly through the upper wall of the lower chamber with different extensions 30a and 30b in depth as shown in FIG. 3.

The above arrangements may effect a forced difference of the fluid resistances in the conduits. Further, such usage of some conduits having no extension or shorter extensions, which serve as the elevating conduits and the remaining conduits having longer extensions, which serve as the descending conduits, results in the passing of a larger amount of gas through the conduits and further increases the amount of the circulated particles. In such cases, the difference between the extensions from the top of the lower chamber may be preferably about 50 mm. or more. About two-tenths of all the conduits may preferably be adpoted for the descending conduits effecting the downward solid particle flow therethrough.

A "blow-through phenomenon" or an "entrainment phenomenon" of the particles with tendencies causing the particles to leave the upper chamber through the exhaust outlet 22 may be effectively prevented by means of the well-known baffle or the inserting-type cyclone (see Daizo Kunii & Octane Levenspiel; Fluidization Engineering, p. 408, 1969) disposed in the upper chamber 2.

In the reacting vessel II, a reactant gas of hydrocarbon having five carbon atoms or less is continuously fed through the gas inlet 42 to pass upwardly through the perforated plate 41 and the mixture of the reactant and the product is discharged out of the vessel through the gas outlet 43, while the other solid particles are maintained as a heat transfer medium in the heating vessel I as described above.

In both processes simultaneously carried out in the respective vessels, the resultant fluidized bed F in the reacting vessel II contacts the conduits enclosed thereby, and the heat transfer is effected between the fluidized circulating stream through the conduits of the heating vessel I and the fluidized bed in the reacting vessel II, particularly between the catalyst particles contacting the outer surfaces of the conduit walls and the heated solid particles contacting the inner surfaces of the conduit walls.

The material gas in the reacting vessel II is, of course, heated through the conduit walls utilized as heating surfaces. However, the material gas is given most of its additional enthalpy from the catalyst particles heated through the heating surfaces. Consequently, the dehydrogenation of the material gas in the presence of the heated catalyst is effected by the required heat transferred from the heated fluidized bed in the heating vessel I through the conduits thereof. The catalyst particles, of which activity has thus been decreased in the reaction process, may be removed effectively through the particle outlet 44 of the reacting vessel II.

The reacting vessel II may be disposed to enclose only the intermediate portion consisting of the conduits as shown in FIG. 1. Alternatively, such an arrangement enclosing not only the conduits, but also the upper chamber as shown in FIG. 2 may be adopted to minimize a heat loss. In a case of comparatively big temperature difference between the enclosed conduits and the reacting vessel II, it is necessary to absorb a strain or distortion which is caused by the difference of the thermal expansions in the partially enclosed vessel I and the reacting vessel II. Therefore, it is desirable to absorb such thermal strain by additional absorbing means such as the so-called "expansion ring" mounted on the side wall of the enclosing vessel II or mounted on the conduits of the main vessel I. However, serious problems involved in the absorption of the thermal strain, are weaknesses of such means against heat and the mechanical forces and high cost from an economical viewpoint.

Under the circumstances, such apparatus as shown in FIG. 2 being similar to the "travelling head type" are preferable. In this case, a problem of sealing space between the reacting vessel II and the exhaust outlet 22 of the heating vessel I, which extends upwardly through the top of the reacting vessel II, is easily solved by the use of a labyrinth packing. Such apparatus are advantageous because there is no need to utilize such a complicated arrangement and further effective absorption of the thermal strain is produced in the reactor. Incidentally, the exhaust outlet 22 of the unit shown in FIG. 2 may be utilized as an inlet of the solid particles.

The solid particles used as a heat transfer medium are exemplified by sand, cement clinker, magnesia clinker, alumina, alumina-silica, mullite and carbon. Carbon particles or mullite particles are most preferable, because such particles have considerable strength against attrition or breakage under high temperature conditions. An optimum particle size depends upon the heating gas velocity, the inside diameter of the conduits etc., but generally, the range of variation of the particle size is preferably from 50 to 1500$\mu$, with a preferred range of from 50 to 500$\mu$. The temperature range of the heating gas at the gas inlet is from 700 to 1600° C. with a preferred range of from 800 to 1300° C. The waste heat produced in the chemical process or iron manufacturing process is advantageous for heating a gas adopted as the heating gas to be fed into the heating vessel I to the above temperature level.

As the material gas, such saturated hydrocarbons having five carbon atoms or less such as ethane, propane, butane, pentane may be employed. Particularly, propane and butane are most preferable. As for the catalyst particles for dehydrogenation reaction, catalysts having activity for dehydrogenation with sufficient strength against pulverization in the reaction process, such as the well-known aluminum chromium, manganese-aluminum gel or Fe-chromium, or those catalysts including additionally such a metal as Zn, Cd, Ca, Mg, Si, Pb, Sb, B, Bi, V, P, Co, Ni, K, Cu, W, or Sn may be employed.

The range of variation of the catalyst particle size is preferably from 10 to 1000$\mu$ with a preferred range of from 10 to 100$\mu$.

Concerning the reaction temperature, a lower temperature results in a lower reaction rate, and a much higher temperature effects a larger variety of side reactions. Further, at the higher temperature, a larger amount of carbonaceous substance is deposited on the catalyst surfaces. The temperature range is from 500 to 700° C. with a preferred range of from 550 to 650° C. A desirable contacting time of the reactant gas with the catalyst depends upon the material gas, the reaction temperature, the catalyst etc. From a general viewpoint, the contacting time range is from 0.5 to 10 seconds with a preferred range of from 1 to 5 seconds.

As will be understood, sufficient heat for reacting can be supplied to the heating vessel continuously with great efficiency and the supplied heat is immediately transferred to the catalyst fluidized bed in the reacting vessel so as to maintain the bed at the optimum reaction temperature.

Amounts of the carbonaceous substance deposited from the reactant onto the catalyst particles are slight, because of the turbulent movement of the catalyst particles and further, a continuous removing operation of the deactivated catalyst is allowed through the catalyst outlet, so that a substantially constant level of the catalyst activiy can be maintained in the reacting vessel. Thus, the invention provides an effectively continuous production of olefin from saturated hydrocarbons having five carbon atoms or less on an industrial scale.

The following examples indicate preferable embodiments of the invention.

EXAMPLE 1

A similar type of reactor to that shown in FIG. 1 was employed to produce propylene from propane in the presence of aluminum-chromium catalyst. In the heating vessel I of the reactor, a combustion exhaust gas at high temperature, which had been produced from the combustion of heavy oil in the furnace, was fed through the gas inlet of the lower chamber and was discharged out of the upper chamber, whereby the solid particle delivered to the heating vessel I was fluidized to flow in a circulating state and simultaneously heated. In the above state, in the heating vessel I, preheated propane gas was fed into the reacting vessel II for fluidizing the catalyst particles on the perforated plate and the mixture of the reactant and the product was discharged out of the reacting vessel II. In the process, the dehydrogenation reaction was carried out with the heat transferred from the heated fluidized bed in the heating vessel to the fluidized bed in the reacting vessel through the conduit surfaces of the heating vessel I.

Dimensions of the reactor and the process conditions utilized for the above process are indicated in Table 1 and Table 2, respectively.

The composition of the aluminum chromium catalyst was as follows: $Cr_2O_3$, 3%; $Al_2O_3$, 95%; MgO, 2%. Magnesia clinker was employed as the heat transfer me-

EXAMPLE 2 dium of the solid particles.

The same reactor as used in Example 1 was provided to carry out dehydrogenation of n-butane in the presence of an alumina-chromina catalyst in the reacting vessel I.

Process conditions utilized for the reactor and the results are indicated in Table 3.

The composition of the catalyst was as follows: $Cr_2O_3$, 18%; $Al_2O_3$, 80%; MgO, 20%. Magnesia clinker was also employed as the heat transfer medium.

TABLE 1

Heater I:
  A lower chamber (diameter×height):
    300 mm. φ×600 mm. L
  An upper chamber (diameter×height):
    300 mm. φ×1600 mm. L
  A perforated plate in the lower chamber:
    Number of holes: 9
    Diameter of each hole: 17.3 mm. φ
  Vertical conduits:
    Material: 25 Cr-20 Ni steel
    Number: 14
    Length: 4 m.
Reactor II:
  Vessel (diameter×height): 300 mm. φ×3500 mm. L
  A perforated plate in the vessel:
    Number of holes: 120
    Diameter of each hole: 1 mm. φ

TABLE 2

Processing conditions:
  Solid particles used as heat transfer medium:
    Amount: 65 kg.
    Particle size: 0.3–1.0 mm. φ
    Minimum fluidizing velocity: 32 cm./sec.
  Combustion exhaust gas:
    Volume rate of fluid: 152 Nm.³/hr.
    Temperature at the gas inlet: 1300° C.
  Catalyst particles:
    Amount: 65 kg.
    Particle size: 100–500μ φ
    Minimum fluidizing velocity: 9 cm./sec.
  Preheated material gas: Propane
    Volume rate of fluid: 28 Nm.³/sec.
    Temperature at the gas inlet: 350° C.
  Reaction temperature: 620° C.
Results:
  Temperature of the combustion exhaust gas at the gas outlet: 650° C.
  Amount of circulated particles in the heating vessel: 900 kg./hr.
  Average velocity of the exhaust gas through all the conduits of the heating vessel: 12.7 m./sec. (650° C.)
  Conversion of propane: 56.0%
  Selectivity to propylene: 72.4%
  Yield of propylene: 40.5%

TABLE 3

Processing conditions:
  Solid particles used as heat transfer medium:
    Amount: 65 kg.
    Particle size: 0.3–1.0 mm. φ
    Minimum fluidizing velocity: 9 cm./sec.
  Combustion exhaust gas:
    Volume rate of fluid: 137 Nm.³/hr.
    Temperature at the gas inlet: 1300° C.
  Catalyst particles:
    Amount: 65 kg.
    Particle size: 100–500μ φ
    Minimum fluidizing velocity: 11 cm./sec.
  Preheated material gas: n-Butane
    Volume rate of fluid: 25 Nm.³/hr.
    Temperature at the gas inlet: 400° C.
  Reaction temperature: 595° C.
Results:
  Temperature of the combustion exhaust gas at the gas outlet: 630° C.
  Amount of circulated particles in the heating vessel: 820 kg./hr.
  Average velocity of the exhaust gas through all the conduits of the heating vessel: 11.2 m./sec. (630° C.)
  Conversion of butane: 47.5%
  Selectivity to butene: 70.7%
  Yield of butene: 33.6%

What we claim is:

1. A method of producing an olefin from a saturated hydrocarbon having not more than 5 carbon atoms in the presence of catalyst particles in a reacting vessel incorporated with a heating vessel, containing solid particles used as a heat transfer medium, having a lower chamber provided with a perforated plate for forming a fluidized bed of said solid particles, an upper chamber and an intermediate portion consisting of a plurality of conduits fluidly connected to said both chambers, said reacting vessel enclosing at least said conduits of said heating vessel, wherein a fluidized catalyst bed is maintained in said reacting vessel by a given material gas feed, while a heating gas at high temperature is fed to said lower chamber to pass upwardly through said perforated plate and said conduits and then is discharged out of said upper chamber to create a circulating stream of the fluidized and heated solid particles, between said both chambers through said conduits, whereby sufficient reaction heat, to effect dehydrogenation of said material gas, is transferred from said circulating stream to said fluidized catalyst bed in said reaction vessel through at least said conduits.

2. A method according to claim 1, wherein the dehydrogenation reaction is carried out at a temperature from 500 to 700° C.

3. A method according to claim 2, wherein the dehydrogenation reaction is carried out at a temperature from 550° C. to 650° C.

4. A method according to claim 1, wherein said solid particles used as said heat transfer medium is a member selected from the group consisting of sand, cement, clinker, magnesia clinker, alumina, alumina-silica, mullite and carbon.

5. A method according to claim 1, wherein said solid particles used as said heat transfer medium is of a size from 50 to 1500μ.

6. A method according to claim 5, wherein said solid particles for said heat transfer medium is from 50μ to 500μ.

7. A method according to claim 1, wherein the contact time of said hydrocarbon with catalyst is from 0.5 to 10 seconds.

8. A method according to claim 7, wherein the contact time of said hydrocarbon with said catalyst is from 1 to 5 seconds.

9. A method according to claim 1, wherein said catalyst particles is of a size from 50 ot 3000μ.

10. An apparatus adapted for the catalytic dehydrogenation of a saturated hydrocarbon to an olefin comprising:
(a) a heating vessel having at least one inlet and at least one exhaust outlet for fluidizing gas, an inlet for charging solid particles into said vessel and a perforated plate for forming a fluidized bed;
(b) said vessel having a lower chamber separated by said perforated plate in which said gas inlet is located;
(c) said vessel having an upper chamber in which said exhaust outlet is located;
(d) a plurality of conduits fluidly connecting said lower chamber to said upper chamber, the ratio of the total cross sectional areas of the conduits to the horizontal sectional area of the lower chamber being at least 1:25;
(e) a reaction vessel associated in heat transfer relation with said heating vessel;
(f) said reaction vessel having an inlet for catalyst particles and an inlet for material gas; and
(g) said reaction vessel having an outlet for the discharge of the catalyst particles and an outlet for the discharge of the material gas after dehydrogenation of the material gas by the heat transfer.

11. Apparatus according to claim 10 in which said reaction vessel is located between said upper chamber and said lower chamber and surrounds said conduits.

12. Apparatus according to claim 11 in which said particle inlet and said gas outlet are located adjacent an upper part of said reaction vessel on opposite sides thereof, said gas inlet and said particle outlet are located adjacent a lower part of said reaction vessel on opposite sides thereof, and said particle inlet and said gas inlet are located on the same side of said reaction vessel.

References Cited
UNITED STATES PATENTS

| | | | |
|---|---|---|---|
| 2,432,298 | 12/1947 | Eastwood et al. | 208—164 |
| 2,674,612 | 4/1954 | Murphree | 23—1 |
| 2,254,555 | 9/1941 | Thomas | 260—683.3 |
| 2,931,711 | 4/1960 | Walker | 208—163 |

DELBERT E. GANTZ, Primary Examiner

C. E. SPRESSER, JR., Assistant Examiner

U.S. Cl. X.R.

23—288 S, 208—113, 163, 164

UNITED STATES PATENT OFFICE
CERTIFICATE OF CORRECTION

Patent No. 3,754,051                    Dated August 21, 1973

Inventor(s) Yuichi Suzukawa, et al

It is certified that error appears in the above-identified patent and that said Letters Patent are hereby corrected as shown below:

Col. 7, line 46: "EXAMPLE 2" should appear in line 48;

Col. 8, line 35: Replace "9 cm./sec." by --32cm./sec.--

Signed and sealed this 7th day of May 1974.

(SEAL)
Attest:

EDWARD M.FLETCHER,JR.                C. MARSHALL DANN
Attesting Officer                     Commissioner of Patents